A. A. BLOMFELDT.
SPRAYING MECHANISM.
APPLICATION FILED OCT. 15, 1913.
1,108,885.
Patented Sept. 1, 1914.
2 SHEETS—SHEET 2.
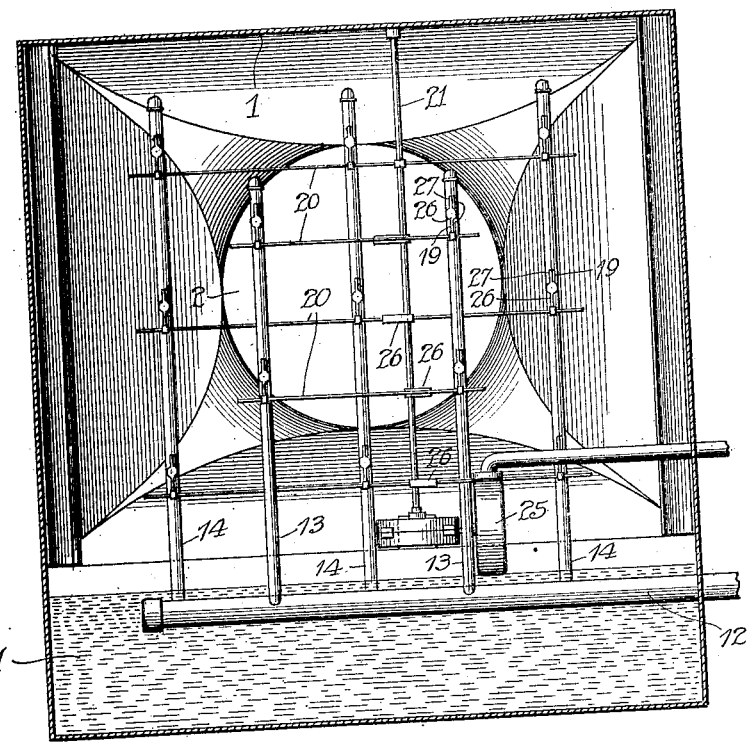
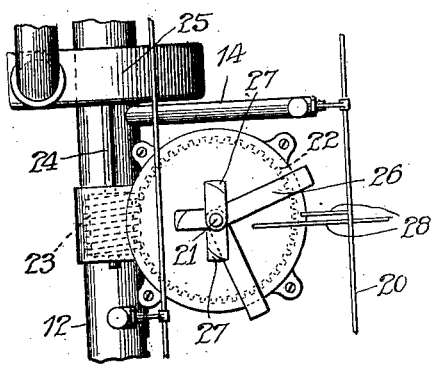
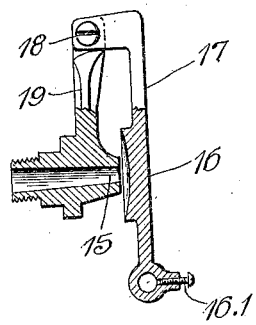
Witnesses
Martin H. Olsen.
Frieda Dunkel.
Inventor
Allen A. Blomfeldt,
By Rummler & Rummler, Att'ys

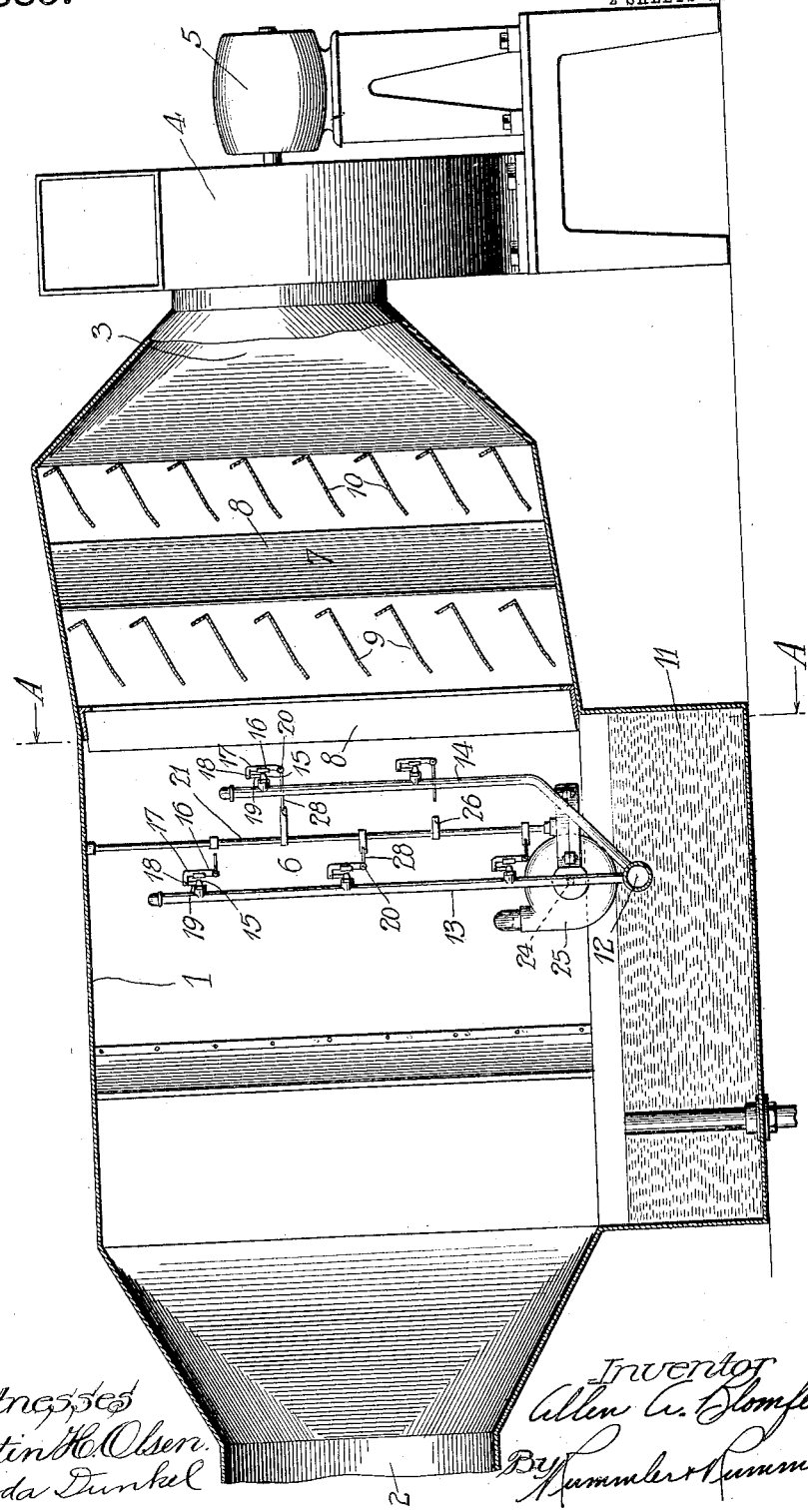

UNITED STATES PATENT OFFICE.

ALLEN A. BLOMFELDT, OF CHICAGO, ILLINOIS.

SPRAYING MECHANISM.

1,108,885.
Specification of Letters Patent.
Patented Sept. 1, 1914.

Original application filed February 20, 1913, Serial No. 749,657. Divided and this application filed October 15, 1913. Serial No. 795,241.

*To all whom it may concern:*

Be it known that I, ALLEN A. BLOMFELDT, a citizen of the United States of America, and a resident of Chicago, county of Cook, and State of Illinois, have invented certain new and useful Improvements in Spraying Mechanisms, of which the following is a specification.

The main objects of this invention are, to provide an improved form of air conditioning apparatus; to provide an improved construction and arrangement of spraying means for washing air passing through the apparatus, and to provide improved mechanism for flushing said spraying means so as to prevent the clogging thereof by sediment, etc.

An illustrative embodiment of this invention is shown in the accompanying drawings, in which—

Figure 1 is a longitudinal sectional elevation of the apparatus. Fig. 2 is a transverse section taken on the line A—A of Fig. 1. Fig. 3 is an enlarged plan view of the means for flushing the spraying mechanism. Fig. 4 is an enlarged detail, partly sectional, of one of the sprayers.

In the construction shown in the drawings, a casing 1, preferably of rectangular cross section, is provided with an inlet opening 2, and an outlet opening 3, through which air is caused to pass by means of the blower 4, operated by the motor 5. Within the casing is arranged spraying mechanism 6, and an eliminator 7. The air in passing through the apparatus is first washed free of impurities by the spraying mechanism 6, and then has excessive moisture carried in suspension removed therefrom by means of the vertical baffle walls 8 and horizontal walls 9 and 10 of the eliminator 7. The casing is mounted on a tank 11, arranged below the spraying mechanism, which is adapted to supply water therefor.

The spraying or washing mechanism includes a header 12 in the form of a horizontally disposed pipe, located in the tank, which supports the vertical pipes 13 and 14 respectively arranged across the interior of the casing 1 in two transverse planes. Nozzles 15 are secured to the pipes 13 and 14 and are spaced apart vertically in horizontally alined sets. A plate or spoon 16 is arranged in front of each of the nozzles 15 which forms the jet of water issuing from the nozzle into a transverse sheet or spray. The spoons are integrally formed on the arms 17 which are pivoted at 18 to the lugs 19 integrally formed on the nozzles 15. The lower ends of the horizontally alined arms 17 are connected together in sets by means of rods 20 rigidly attached thereto by means of set screws 16.1. The rods 20 connecting the alined sets of arms 18 are adapted to be shifted for the purpose of swinging the spoons 16 away from the nozzles 15 for flushing the sprays.

The means for causing the flushing of the spraying mechanism includes a vertically disposed rotatable member or shaft 21 mounted between the two transverse planes of sprayers and connected to a worm gear 22, which is operated by means of a worm 23 carried on the shaft 24 of the water motor 25. A plurality of cams or arms 26 are secured to the shaft 21 in angular arrangement and respectively located opposite the rods 20. The cams are provided with inclined surfaces 27 (Fig. 3) which are adapted to engage the ends of the pins or shoulders 28 extending inwardly from the rods 20 and shift the arms 17 to which the corresponding rods 20 are connected. The movement of the arms causes the spoons 16 to be swung away from the jets issuing from the nozzles 15 so as to increase the space between the spoons and the ends of the nozzles, thereby allowing the escape of particles of sediment, etc. that might be lodged therein.

The operation of the device shown is as follows: The inlet 2 of the apparatus is suitably connected to the atmosphere from whence air is drawn through the apparatus by means of the blower 4. The air is first caused to pass through two transverse sheets of water issuing from the spraying mechanism 6 by which it is washed free of dust and gases. As the air passes through the eliminator 7, any excessive moisture carried in suspension is liberated as the air strikes the vertical and horizontal baffle walls.

Although but one specific embodiment of this invention has been herein shown and described, it will be understood that numerous details of the construction shown may be altered or omitted without departing from the spirit of this invention as defined by the following claims.

I claim:—

1. Air conditioning apparatus, comprising a casing, a water supply arranged in said casing, a plurality of pipes arranged in said casing in a plane transverse to the flow of air, spraying mechanism including a plurality of nozzles secured to said pipes in spaced relation, spoons shiftably mounted in front of said nozzles, means connecting certain of said spoons, a shaft rotatably mounted adjacent to said pipes, a plurality of cams angularly arranged on said shaft and being respectively adapted to engage said connecting means for shifting said spoons so as to flush said spraying mechanism, and mechanism for rotating said shaft.

2. Air conditioning apparatus, comprising a casing, a water header arranged in said casing, a plurality of pipes connected to said header and disposed in a plurality of transverse planes with respect to said casing, spraying mechanism including a plurality of nozzles secured to said pipes and spaced apart longitudinally, spoons shiftably mounted in front of said nozzles, means connecting certain of said spoons, a vertically disposed shaft rotatably mounted between the transverse planes of said pipes, a plurality of cams angularly arranged on said shaft and being respectively adapted to engage said connecting means for shifting said spoons so as to flush said spraying mechanism, mechanism for rotating said shaft, and other means adapted to supply water to said header.

3. Air conditioning apparatus, comprising a casing, spraying mechanism including a plurality of vertically disposed water supply pipes arranged in said casing in transverse planes, spraying mechanism comprising nozzles connected to said pipes and spaced apart vertically in horizontally alined sets, a lug on each of said nozzles, an arm pivotally mounted on each of said lugs, a spoon arranged on each of said arms opposite the respective nozzle, rods connected to the lower ends of the alined sets of arms, a shaft rotatably mounted in said casing, and cams on said shaft adapted to engage said rods for shifting said spoons outwardly from said nozzles in the plane thereof, and means for supplying water to said pipes.

Signed at Chicago this 13th day of October 1913.

ALLEN A. BLOMFELDT.

Witnesses:
EDWIN PHELPS,
JENNIE BURT.

Copies of this patent may be obtained for five cents each, by addressing the "Commissioner of Patents, Washington, D. C."